(12) United States Patent
Feilders et al.

(10) Patent No.: US 9,844,101 B2
(45) Date of Patent: Dec. 12, 2017

(54) SYSTEM AND METHOD FOR UNIFORM MICROWAVE HEATING

(71) Applicant: SCP SCIENCE, Baire d'Urfe (CA)

(72) Inventors: George Feilders, Beaconsfield (CA); Ali Bostani, Cote-St-Luc (CA); Art Ross, Selkirk (CA); Raymond Waterbury, Mirabel (CA); Guobin Ma, Dorval (CA)

(73) Assignee: SCP SCIENCE, Quebec (CA)

( * ) Notice: Subject to any disclaimer, the term of this patent is extended or adjusted under 35 U.S.C. 154(b) by 253 days.

(21) Appl. No.: 14/579,305

(22) Filed: Dec. 22, 2014

(65) Prior Publication Data

US 2015/0181654 A1    Jun. 25, 2015

Related U.S. Application Data

(60) Provisional application No. 61/919,326, filed on Dec. 20, 2013.

(51) Int. Cl.
*H05B 6/64* (2006.01)
*H05B 6/70* (2006.01)
(Continued)

(52) U.S. Cl.
CPC ......... *H05B 6/6402* (2013.01); *H05B 6/6408* (2013.01); *H05B 6/705* (2013.01);
(Continued)

(58) Field of Classification Search
CPC .............. B01J 19/126; B01J 2219/1218; B01J 2219/00601; B01J 2219/0024; B01J 2219/00283; B01J 2219/00306; H05B 6/806; H05B 6/802; H05B 6/701; H05B 2206/044; B01L 3/50851;
(Continued)

(56) References Cited

U.S. PATENT DOCUMENTS

| 4,518,932 A | * | 5/1985 | Pickering | H01J 23/207 |
|  |  |  |  | 315/39.55 |
| 5,230,865 A | * | 7/1993 | Hargett | B01J 19/126 |
|  |  |  |  | 219/686 |

(Continued)

*Primary Examiner* — Dana Ross
*Assistant Examiner* — Joe E Mills, Jr.
(74) *Attorney, Agent, or Firm* — Norton Rose Fulbright Canada LLP

(57) ABSTRACT

A microwave heater comprises a cylindrical housing having an inner surface defining an internal cavity. A microwave generator is secured adjacent a first end of the housing and received inside the internal cavity is a sample holder that comprises an annular base member positioned adjacent the first end has a central axis coinciding with a longitudinal axis of the housing. A first opening is formed along the central axis, an outlet of the microwave generator extending through the first opening along the central axis for emitting into the internal cavity electromagnetic waves centered at a given microwave wavelength. A circular support plate substantially parallel to the base member and concentric therewith, a cavity portion defined therebetween, is separated from the base member by a distance less than the given microwave wavelength for establishing a Transverse Magnetic (TM) 01 mode as a predominant resonance mode inside the cavity portion.

18 Claims, 13 Drawing Sheets

(51) Int. Cl.
 *H05B 6/80* (2006.01)
 *H05B 6/72* (2006.01)
 *H05B 6/74* (2006.01)

(52) U.S. Cl.
 CPC ............... *H05B 6/72* (2013.01); *H05B 6/74* (2013.01); *H05B 6/806* (2013.01); *Y02B 40/146* (2013.01)

(58) Field of Classification Search
 CPC ...... B01L 2300/1866; B01L 2300/1805; B01F 15/067; B01F 2215/0037
 USPC .......................................................... 219/750
 See application file for complete search history.

(56) References Cited

U.S. PATENT DOCUMENTS

| | | | | |
|---|---|---|---|---|
| 5,304,766 | A * | 4/1994 | Baudet | B01J 19/126 219/687 |
| 5,320,804 | A * | 6/1994 | Zakaria | A23L 3/01 219/686 |
| 5,324,483 | A * | 6/1994 | Cody | B01J 19/0046 422/534 |
| 5,382,414 | A * | 1/1995 | Lautenschlager | B01D 11/0219 204/902 |
| 5,498,857 | A * | 3/1996 | Jacquault | B01J 19/126 219/687 |
| 5,601,745 | A * | 2/1997 | Schalk | B01J 3/002 219/686 |
| 5,632,921 | A | 5/1997 | Risman et al. | |
| 5,637,803 | A * | 6/1997 | Schalk | B01J 3/002 60/567 |
| 5,714,127 | A * | 2/1998 | DeWitt | B01J 19/0046 422/130 |
| 5,858,178 | A * | 1/1999 | Lautenschlager | B01J 3/04 159/22 |
| 5,981,924 | A * | 11/1999 | Lautenschlager | B01J 3/002 219/685 |
| 6,013,910 | A | 1/2000 | Ferraro et al. | |
| 6,060,022 | A * | 5/2000 | Pang | G01N 35/0095 422/63 |
| 6,084,226 | A * | 7/2000 | Greene | B01J 19/126 219/710 |
| 6,111,238 | A * | 8/2000 | Fix, Sr. | G01N 1/44 219/700 |
| 6,120,741 | A * | 9/2000 | Jacquault | B01J 19/126 422/199 |
| 6,152,072 | A * | 11/2000 | Barmatz | C23C 16/481 118/722 |
| 6,157,015 | A | 12/2000 | Gaisford et al. | |
| 6,579,501 | B1 * | 6/2003 | Knapp | H05B 6/802 422/105 |
| 6,624,399 | B2 | 9/2003 | Rypan | |
| 6,649,889 | B2 * | 11/2003 | Jennings | B01J 19/126 204/157.43 |
| 7,208,710 | B2 * | 4/2007 | Gregoire | H05B 6/704 219/697 |
| 7,863,547 | B2 | 1/2011 | Drozd et al. | |
| 8,480,981 | B2 * | 7/2013 | Hargett, Jr. | B01J 19/126 215/260 |
| 8,852,534 | B2 * | 10/2014 | Feilders | B01L 7/00 422/562 |
| 2002/0061372 | A1 * | 5/2002 | Hargett, Jr. | B01J 3/048 428/36.3 |
| 2002/0101310 | A1 * | 8/2002 | Jennings | B01J 19/126 333/248 |
| 2002/0176814 | A1 * | 11/2002 | Lautenschlager | B01J 19/126 422/186 |
| 2003/0127311 | A1 * | 7/2003 | Lautenschlager | B01J 3/03 202/96 |
| 2003/0127313 | A1 * | 7/2003 | Lautenschlager | B01J 3/03 202/96 |
| 2003/0170149 | A1 * | 9/2003 | Jennings | B01J 19/126 422/129 |
| 2003/0194352 | A1 * | 10/2003 | Lautenschlager | B01J 3/03 422/400 |
| 2003/0199099 | A1 * | 10/2003 | King | B01J 3/03 436/148 |
| 2004/0179977 | A1 * | 9/2004 | Hargett, Jr. | B01J 19/126 422/400 |
| 2005/0145646 | A1 * | 7/2005 | Lautenschlaeger | B01J 19/126 222/1 |
| 2006/0147352 | A1 * | 7/2006 | Ulin | B01J 19/0093 422/400 |
| 2007/0202607 | A1 * | 8/2007 | Revesz | B01L 3/50255 436/174 |
| 2008/0245787 | A1 * | 10/2008 | Lambert | B01J 19/0046 219/710 |
| 2009/0294441 | A1 * | 12/2009 | Wen | F24C 15/023 219/756 |
| 2010/0227413 | A1 * | 9/2010 | Hargett, Jr. | B01J 3/03 436/175 |
| 2010/0270291 | A1 * | 10/2010 | Kotzian | H05B 6/701 219/690 |
| 2011/0036705 | A1 * | 2/2011 | Barclay | H05B 6/6447 204/157.15 |
| 2011/0139773 | A1 | 6/2011 | Fagrell et al. | |
| 2011/0198345 | A1 * | 8/2011 | Feilders | B01L 7/00 219/702 |
| 2011/0226608 | A1 * | 9/2011 | Lautenschlager | B01J 19/126 204/157.15 |
| 2012/0175328 | A1 * | 7/2012 | Bosch | B01L 9/06 211/85.18 |
| 2013/0241407 | A1 * | 9/2013 | Whyman | H01J 25/52 315/39.75 |
| 2013/0256127 | A1 * | 10/2013 | Young | C23C 14/35 204/298.08 |
| 2014/0034636 | A1 * | 2/2014 | Yamamoto | H05B 6/6402 219/756 |
| 2014/0117008 | A1 * | 5/2014 | Lautenschlaeger | H05B 6/6402 219/756 |
| 2014/0360287 | A1 * | 12/2014 | Feilders | B01L 7/00 73/863.11 |
| 2015/0090710 | A1 * | 4/2015 | Kotzian | H05B 6/707 219/754 |
| 2015/0093308 | A1 * | 4/2015 | Zentner | H05B 6/6411 422/566 |

\* cited by examiner

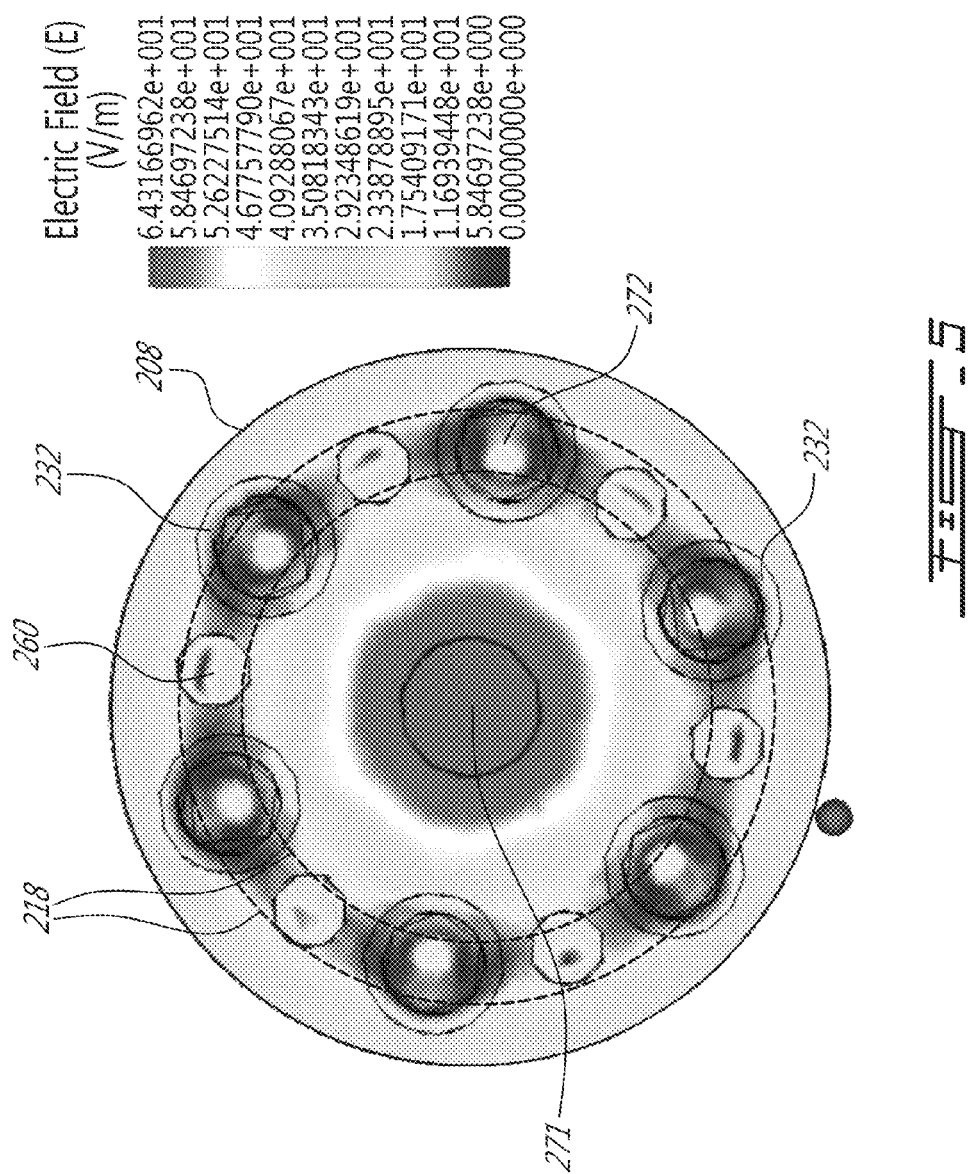

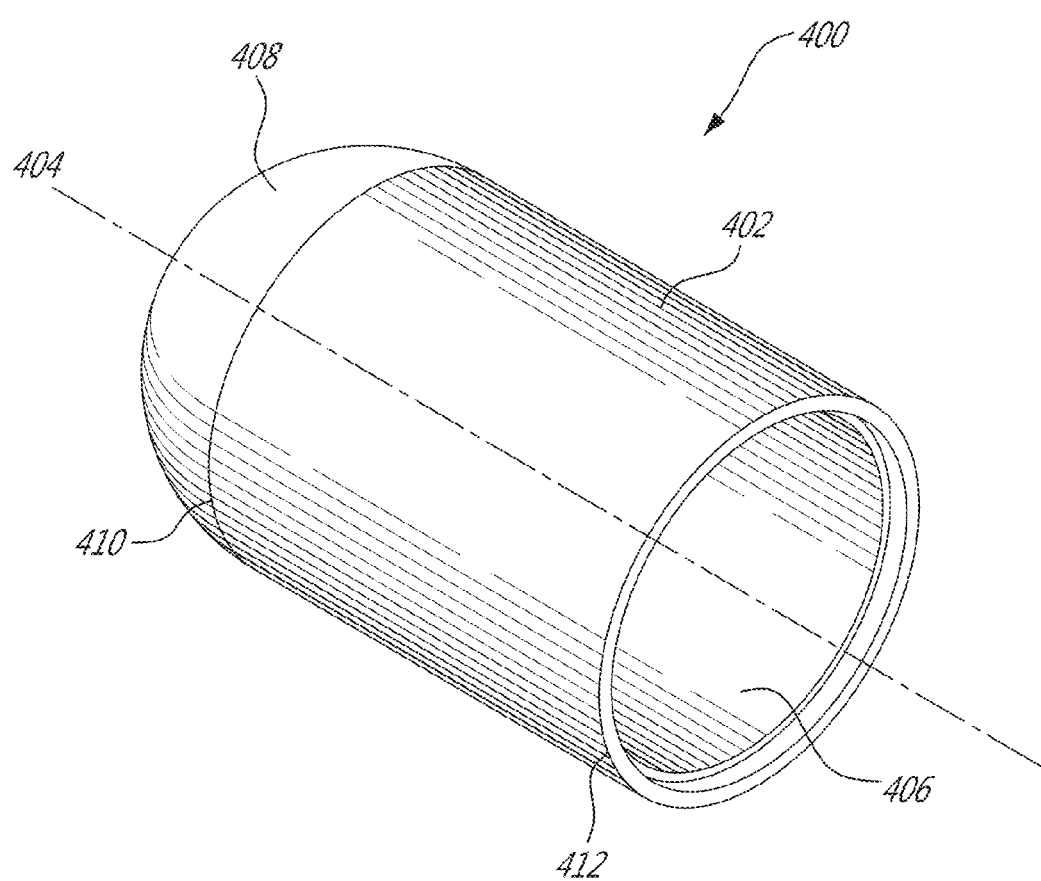

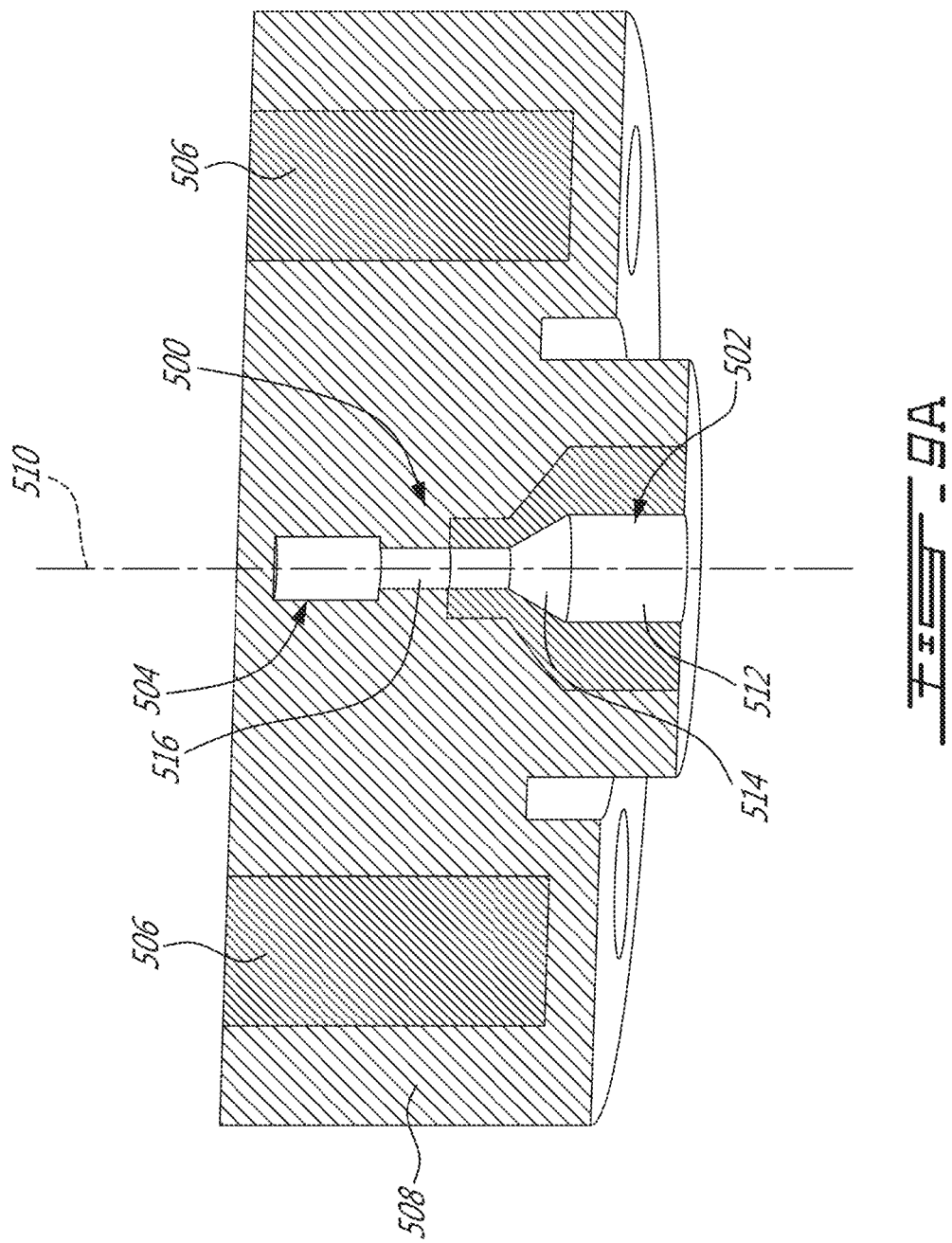

SYSTEM AND METHOD FOR UNIFORM MICROWAVE HEATING

CROSS-REFERENCE TO RELATED APPLICATIONS

This patent application claims priority of U.S. provisional Application Ser. No. 61/919,326, filed on Dec. 20, 2013, the contents of which are hereby incorporated by reference.

TECHNICAL FIELD

The present invention relates to the field of microwave heating, particularly microwave heating of sample materials.

BACKGROUND

Microwave heaters or dielectric heaters are devices used for heating loads incorporating a microwave absorbent matter. Generally, the microwave heater has a magnetron (or microwave generator) for generating waves into a cavity wherein the load is to be positioned. As the waves exhibit multiple reflections inside the cavity, standing waves are established therein. These standing waves, when oscillating at a high frequency, create rotation in the molecular dipoles and cause vibration of the molecules and thus generate heat.

Standing waves in a multimode cavity are characterized by having portions where the electric field is null (i.e., nodes or cool spots) and portions where the electric field is maximum (i.e. anti-nodes or hot spots). Therefore, when the load spatially extends from a node to an anti-node, non-uniform heating may occur. This can be problematic as one may want to heat either a large load or multiple loads uniformly all at once. The 'spot' issue is typically addressed by providing the microwave heater with a turntable which rotates the substance to be heated during operation. However, turntables add mechanical complexity to microwave heaters and increase costs.

There is therefore a need for improved microwave heating systems and methods.

SUMMARY

This specification addresses the issue of non-uniform heating by a design which provides a propagation mode having a geometrical design including a region where the heating can be performed uniformly.

More specifically, in the illustrated embodiments, a standing wave characterized by the transverse mode TM01 is established in a cylindrical cavity area having an axial length which is smaller than the wavelength of the microwaves. Accordingly, the TM01 transverse standing wave has an annular region corresponding to a portion of the standing wave along which uniform heating can be achieved. Henceforth, in the embodiment illustrated herein, the material to be heated is disposed in the annular region, and a turntable is not required.

In accordance with another aspect, there is provided a microwave heater comprising a cylindrical housing having an inner surface defining an internal cavity, a microwave generator secured to the housing adjacent a first end thereof, and a sample holder received inside the internal cavity. The sample holder comprises an annular base member positioned adjacent the first end, the base member having a central axis coinciding with a longitudinal axis of the housing and a first opening formed along the central axis, an outlet of the microwave generator extending through the first opening along the central axis for emitting into the internal cavity electromagnetic waves centered at a given microwave wavelength, and a circular support plate substantially parallel to the base member and concentric therewith, the support plate separated from the base member by a distance less than the given microwave wavelength for establishing a Transverse Magnetic (TM) 01 mode as a predominant resonance mode inside a cavity portion defined between the support plate and the base member, thereby suppressing a multimode effect from the cavity portion.

In accordance with another aspect, there is provided a cylindrical reflector arrangement for a microwave heater. The cylindrical reflector arrangement comprises a cylindrical housing having an inner surface defining an internal cavity, and a sample holder received inside the internal cavity. The sample holder comprises an annular base member positioned adjacent a first end of the housing, the base member having a central axis coinciding with a longitudinal axis of the housing and a first opening formed along the central axis, the first opening adapted to receive an outlet of a microwave generator adapted to generate into the internal cavity electromagnetic waves centered at a given microwave wavelength, and a circular support plate substantially parallel to the base member and concentric therewith, the support plate separated from the base member by a distance less than the given microwave wavelength for establishing a Transverse Magnetic (TM) 01 mode as a predominant resonance mode inside a cavity portion defined between the support plate and the base member, thereby suppressing a multimode effect from the cavity portion.

In accordance with another aspect, there is provided a method of microwave heating of samples. The method comprises providing a cylindrical housing having an inner surface defining an internal cavity, receiving a sample holder inside the internal cavity, the sample holder comprising an annular base member and a circular support plate defining a cavity portion therebetween and having a central axis coinciding with a longitudinal axis of the housing, the support plate separated from the base member by a distance less than a given microwave wavelength for establishing a Transverse Magnetic (TM) 01 mode as a predominant resonance mode inside the cavity portion, thereby suppressing a multimode effect from the cavity portion, the support plate having formed therein a plurality of apertures each adapted to receive therein corresponding one of a plurality of sample recipients, the plurality of apertures disposed radially and equi-angularly about the central axis at a fixed distance therefrom, each one of the plurality of sample recipients extending along a direction substantially parallel to the longitudinal axis and protruding into the cavity portion, and applying electromagnetic waves generated by a microwave generator to the cavity portion, the microwave generator secured to the housing and having an outlet extending along the central axis into the cavity portion for emitting therein electromagnetic waves centered at the given wavelength.

Many further features and combinations thereof concerning the present improvements will appear to those skilled in the art following a reading of the instant disclosure.

DESCRIPTION OF THE FIGURES

In the figures,

FIG. 5 is a schematic transversal view illustrating an electric field distribution of the test tube microwave heater of FIG. 2;

FIG. 8A is a perspective view of an antenna, in accordance with a first illustrative embodiment;

FIG. 9A is a perspective view of an antenna arrangement, in accordance with a second illustrative embodiment;

DETAILED DESCRIPTION

Figure 1:
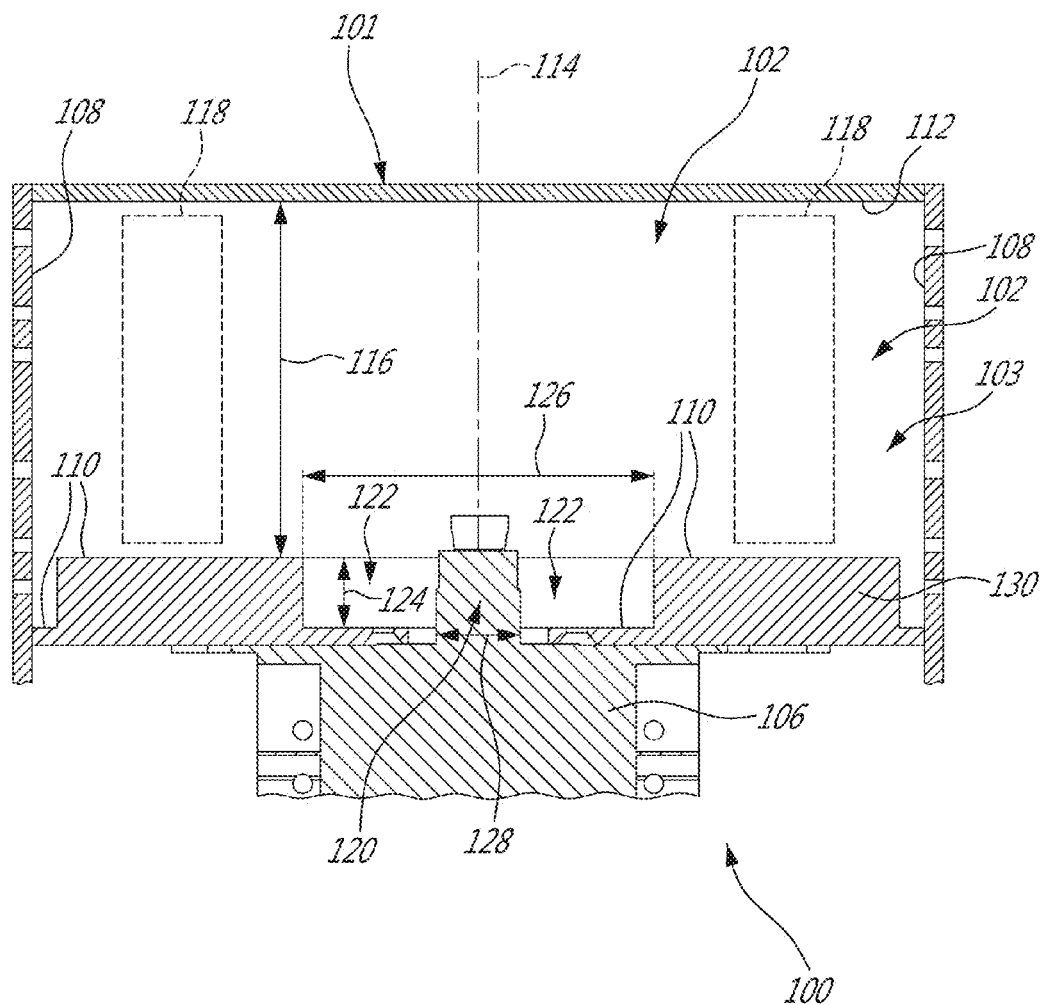
FIG. 1 is an axial cross-sectional view of a first example of a microwave heater.

FIG. 1 shows a first example of a microwave heater 100 in accordance with an embodiment presented herein. The microwave heater 100 (and other microwave heater embodiments discussed further below) is illustratively used for sample digestion, e.g. extraction or decomposition of a sample material. In one embodiment, pressurized microwave heating, and more specifically microwave acid digestion, is performed. The microwave heater 100 generally includes a cylindrical reflector arrangement 101 having a cylindrical cavity 102, and a magnetron 106 (which is sometimes alternately referred to as a microwave generator) which is operated to drive the microwave heater 100. The cylindrical cavity 102 can be understood to be generally enclosed by a cylindrical reflector 108, and two end reflectors 110, 112 each extending along a plane substantially perpendicular to a longitudinal axis 114 of the cylindrical reflector 108. The longitudinal axis 114 of the cylindrical reflector 108 is oriented vertically in this embodiment as this can be more practical in some applications, but it will be understood that the electromagnetic functions of the microwave heater are typically unaltered by the choice of the orientation of the axis 114. The reflectors 108, 110, 112 are made of an electrically conductive material (e.g. a metal) proper for reflecting electromagnetic waves such as known in the art. It should be understood that, in an alternative embodiment, the wave reflecting material may be provided (e.g. applied) on at least one (e g. inner and/or outer) surface of the reflectors 108, 110, 112 to achieve the desired reflecting effect. The magnetron 106 can have an emission centered around a given microwave wavelength as known in the art.

A significant feature in establishing the (fundamental) TM01 resonance mode in the cylindrical cavity 102 (which is used in the embodiment presented herein) as the predominant resonance mode is the selection of an axial distance 116 between the two end reflectors 110, 112 which is smaller than the given microwave wavelength of the magnetron 106.

Upon establishment of the TM01 resonance mode in the cylindrical cavity 102, an annular region 118 is illustratively creates that corresponds to a region where the intensity of the electric field is even and in which a dielectric to be exposed to the electromagnetic wave in TM01 mode should be exposed. By positioning the magnetron 106 so that it extends axially relative to the cylindrical cavity 102, along the direction of the axis 114 as shown, the electromagnetic intensity generated by the magnetron 106 within the cavity 102 can be satisfactorily even all around the annular region 118 during operation of the microwave heater 100. Henceforth, by positioning objects to be heated in a circumferentially interspaced manner around the axis 114, so they lie within the annular region 118, a satisfactorily equal amount of heating can be achieved in each one of the objects without the use of a turntable.

One challenge in working with the magnetron 106 in a non-multi-mode cavity is the ability to deal with the waves which are reflected back to the magnetron 106, as such waves could cause heating of the magnetron itself and lead to its malfunction, and/or cause a lack of heating efficiency. In the embodiment shown in FIG. 1, this issue is dealt with by impedance matching with the load, which includes providing an annular spacing 122 having a given depth 124 and width 126 and extending radially around the microwave outlet 120. In this specific case, the annular spacing 122 is provided as a circular depression in the first end reflector 110. The specific solution retained in the illustrated embodiment will be detailed below.

As illustrated in FIG. 1, the first end reflector 110 has formed along a central axis (not shown) thereof a central opening 128, the central axis coinciding with the longitudinal axis 114 of the cylindrical reflector 108. When mounted to the microwave heater 100, the microwave outlet 120 protrudes inside the microwave cavity 102 via the central opening 128 of the first end reflector 110. As shown in FIG. 1, the first end reflector 110 can rest on an annular base 130. The microwave heater 100 shown in FIG. 1 can be used for cooking bricks, for instance. A cylindrical cavity area 103 can be understood to correspond to an entirety of the cylindrical cavity 102 in this particular embodiment.

Figure 2:
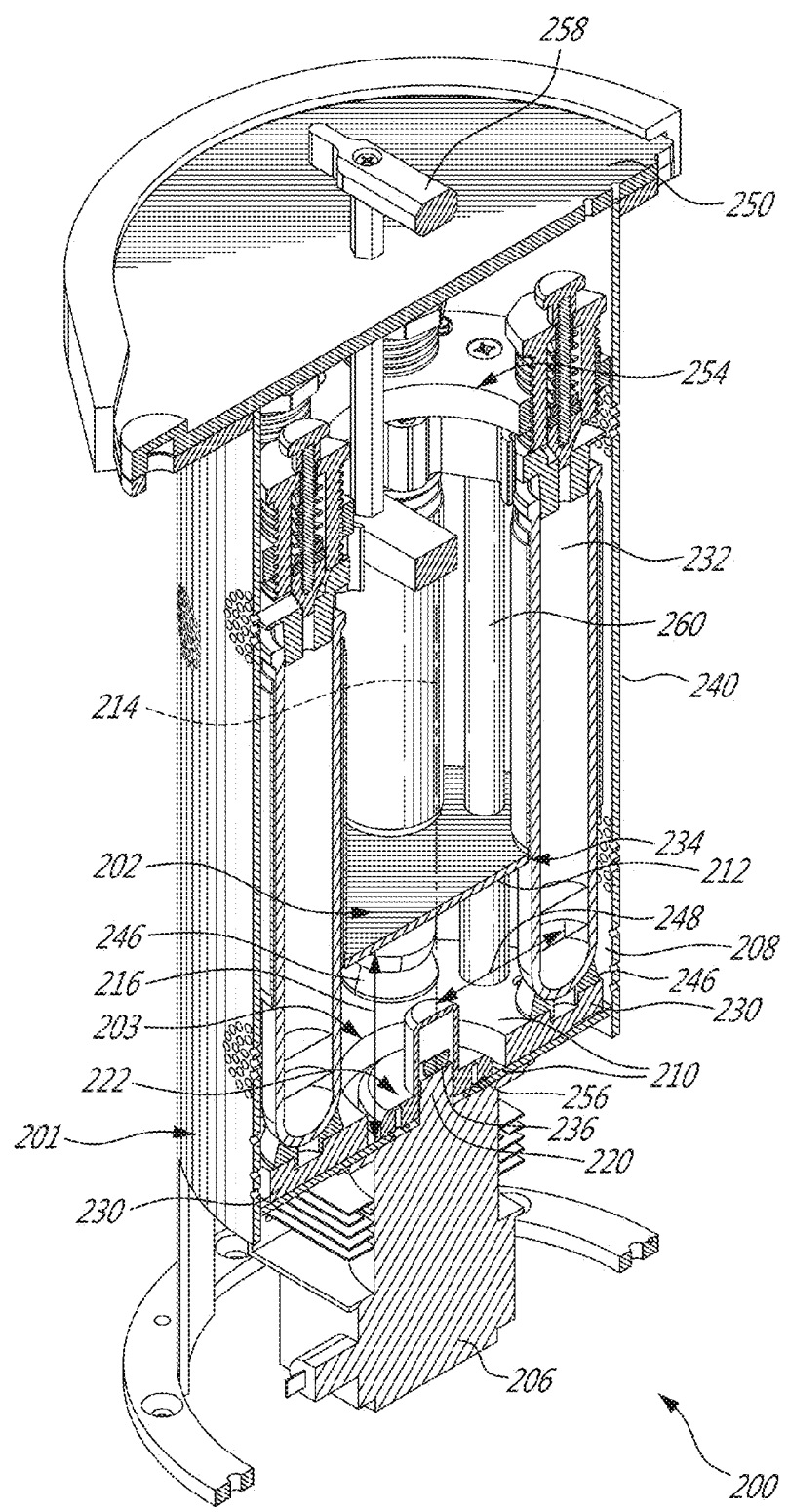
FIG. 2 shows an oblique axial cross-sectional view of a second example of a microwave heater, this second example being specifically adapted to heating pressurized test tubes.

FIG. 2 shows another example of a microwave heater 200 which uses the general principles as the microwave heater shown in FIG. 1, but which is specifically adapted to the heating of a plurality of test tubes (or samples) 232. The test tubes can be pressurized and contain a substance to be heated, as common in the chemical industry. The test tubes themselves can be made of a dielectric material to be "transparent" to the microwaves (such as Quartz or Teflon). In a general manner, this is achieved by providing the microwave heater with a plurality of sockets 234 designed to position at least a portion of the test tubes 232 within the annular region of even heating (as best shown in FIG. 5) for exposing the test tubes 232 to uniform heating.

In this embodiment, the microwave heater also 200 has a magnetron 206 and a cylindrical reflector arrangement 201 enclosing a cylindrical cavity 202. More specifically. In this specific embodiment, a heating area of the microwave heater is provided in the form of a cylindrical cavity area 203 which is a portion (e.g. a reduced portion) of the overall cylindrical cavity 202. As will be understood from the description below, although a minor portion of the microwaves can escape from the cylindrical cavity area 203, a cover 250 (or metallic lid) can prevent them from escaping the cylindrical cavity 202. The cylindrical cavity area 203 is defined within a first (e.g. end) reflector 210, a second (e.g. end) reflector (or supporting plate) 212, and an inner surface of an elongate cylindrical reflector 208 that defines the cylindrical cavity 202. The first and second end reflectors 210, 212 are substantially circular planar members that are substantially parallel and concentric (i.e. have a central axis, not shown, that coincides with a longitudinal axis 214 of the cylindrical reflector 208) and each extend along a plane substantially perpendicular to the longitudinal axis 214. In this embodiment, the cylindrical reflector 208 extends upwardly from the cylindrical cavity area 203 to the cover 250, and can form a relatively non-heating area of the microwave heater, with the heating area limited to the cylindrical cavity area 203 (as will be discussed further below). The magnetron 206 has a microwave outlet 220 having an annular conductive guide 236 used to guide the waves outwardly towards the cylindrical cavity area 203. The waves can be centered at a given wavelength as known in the art, which can be usable to excite molecules of dielectric substance or liquids such as water in the load to be heated by the microwave heater. This excitation causes the molecules to vibrate, which concurrently generate friction and thus heat.

More particularly, the cylindrical cavity area 203 is defined between the cylindrical reflector 208, the first end reflector 210 and the second end reflector 212. The cylindrical reflector 208, first end reflector 210, and second end reflector 212 illustratively form part of the cylindrical reflector arrangement 201. The cylindrical reflector 208 has a longitudinal axis 214 (as discussed above) and a given diameter. The first and second end reflectors 210, 212 illustratively face one another (e.g. are substantially parallel) and are separated by an axial distance 216.

In at least some applications of heating test tubes which involve larger volumes of liquid, it was found that heating only a portion of the substance at the bottom of the test tubes could be satisfactory as the heat can travel along the entire test tube by a convection movement in the case of heating a fluid, and/or by conduction (if conduction is sufficiently present). The option of heating only a portion of the substance at the bottom of the test tubes was retained in this second microwave heater example.

To this end, the second end reflector 212 is provided with a plurality of openings (or apertures) 244 (perhaps best seen in FIG. 4) through which the test tubes 232 can extend to reach the annular region 218 (see FIG. 5) of even heating. In one embodiment, for a cavity 202 having a diameter of about 6 inches, the distance between a central axis of the second reflector 212 (and accordingly the axis 214 as the central axis is illustratively aligned therewith) and a circle (not shown) about which the openings 244 are formed is about 2 inches (where sample recipients having a diameter of about 1 inch are received in the openings 244). This positioning allows to achieve uniform heating. It should however be understood that, depending on the configuration (e.g. dimensions) of the microwave heater 200 and test tubes 232, other configurations may apply.

Referring to FIG. 2, in this specific embodiment, the test tube sockets 234 are provided at (e.g. contact) the perimeter of the openings 244. In addition, the test tube sockets 234 comprise a receiving member 246 that can rest on an annular base 230 of the first end reflector 210. In this embodiment, the receiving members 246 are made of a dielectric material to avoid interfering with the electromagnetic waves. The receiving members 246 may be used to support the sockets 234.

In this specific embodiment, the test tube sockets 234 are radially spaced from the longitudinal axis 214 by a distance 248 (e.g. 2 inches, as discussed above) which coincides with the radial distance between the annular region 218 of even heating and the axis 214. The test tube sockets 234 are circumferentially distanced one from the other, and each of the plurality of openings 244 can be adapted to receive a corresponding test tube 232 that is thus positioned within the heating area(s).

As one skilled in the art may notice, although the entirety of each test tube 232 is illustratively positioned within the cylindrical cavity 202 of the microwave heater 200, the portion of the test tube that is being heated in this embodiment is the portion lying between the first and second end reflectors 210, 212, i.e. the test tube portion lying within the cylindrical cavity area 203 delimited by the first and second end reflectors 210, 212. When in operation, the cylindrical microwave reflector 208 may be positioned vertically (with the longitudinal axis 214 being vertical, as illustrated), where the first end reflector 210 is at the bottom and the second end reflector 212 is at the top. In this position, the substance contained in the bottom portion of the test tubes 232, which are positioned within the microwave cavity, receives heat. The substance contained in the bottom portion of the test tubes 232 may thus be heated first. By convection, the heated atoms and/or molecules may move upward along the test tube 232 while the unheated atoms and/or molecules may move downward along the test tube 232, which can induce a continuous convection movement inside the test tube 232 to distribute the heat. This phenomenon can contribute to the heating of the microwave absorbent material disposed inside each of the test tubes 232. It will be understood that the vertical orientation of the cylindrical microwave reflector 208 can thus contribute to the convection movement in the test tubes 232, and can thus be useful, even though the orientation of the microwave heater does not have an effect on the electromagnetic dynamics at play during operation.

Of course, although test tubes as in 232 are presented, other containers may apply. Also, other means for maintaining microwave absorbent material along an annular region of a cylindrical cavity area can be used in alternate embodiments.

Figure 3:
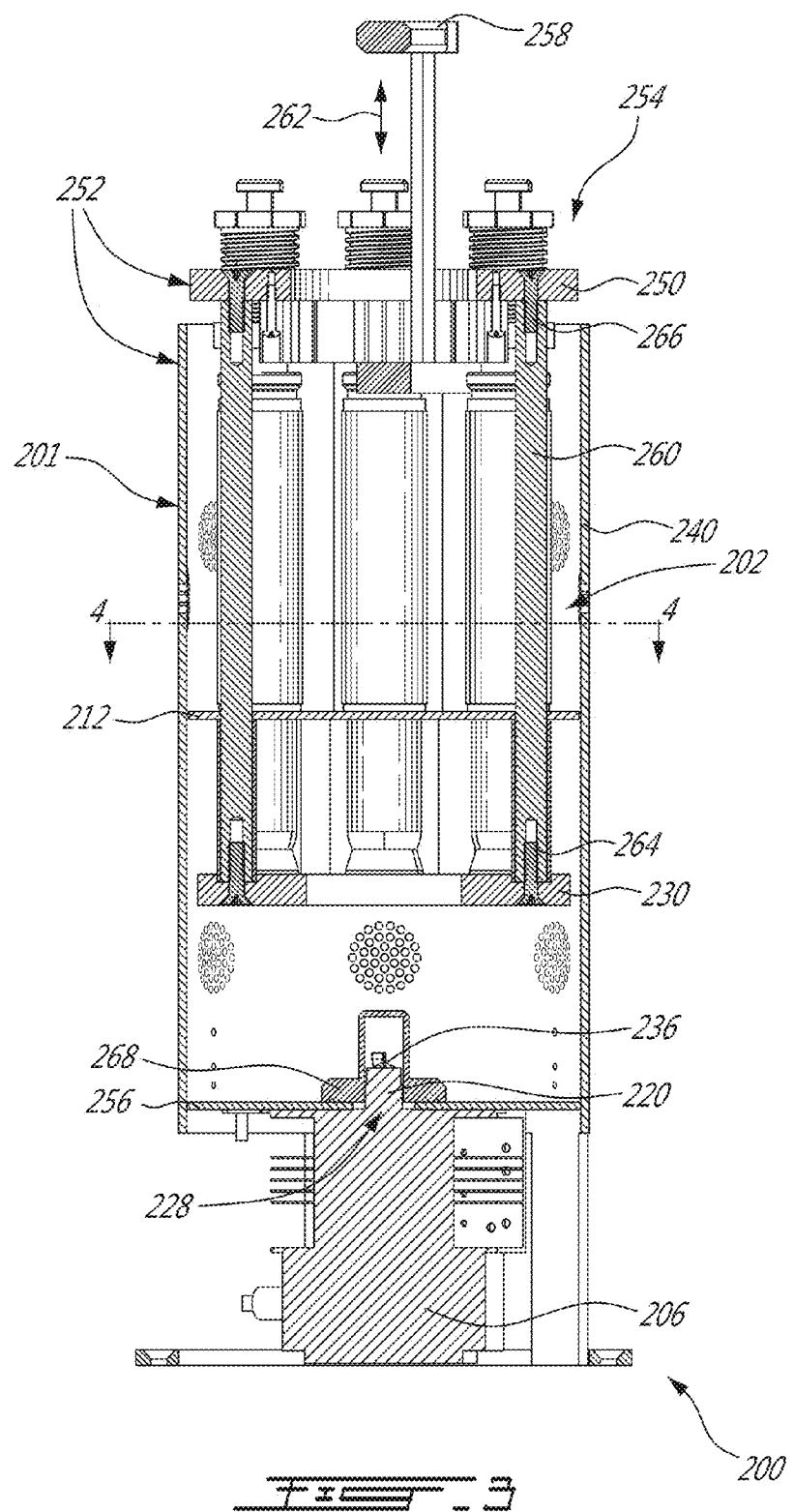
FIG. 3 shows an axial cross-sectional view of the test tube microwave heater of FIG. 2, with a test tube rack being pulled upwardly for removal.

With the two end reflectors 210, 212 fixed, the test tubes 232 can be individually engaged into their corresponding sockets 234 one by one. In this specific embodiment, the cylindrical reflector arrangement 201 comprises a cylindrical wall 240 that is terminated by the cover 250 in order to provide a secure housing 252 for the test tubes 232 during heating. The presence of the elongated cylindrical reflector 208 can impede manual access to the individual test tube sockets 234. In this embodiment, it was found advantageous to provide the sockets 234 as part of a removable rack (or sample holder) 254 in order to allow collective introduction and removal of the test tubes 232 from the secure housing 252 (removal of the removable rack 254 is shown in FIG. 3). The collective removability is made possible, in this embodiment, by the fact that the end reflectors 210, 212 provided at opposite axial ends of the cylindrical cavity area 203 are also made part of the removable rack 254, but are nonetheless intended to be at their correct relative positions during operation of the microwave heater 200.

An issue to consider in this embodiment is to ensure that when the removable rack 254 is inserted inside the secure housing 252, that the end reflectors 210, 212 and test tubes 232 adopt a correct position relative to (e.g. extend along a direction (not shown) substantially parallel to the longitudinal axis 214 and protrude into the cylindrical cavity area 203) the microwave outlet 220 and the cylindrical reflector 208, as this relative position can be key in achieving satisfactory impedance matching and heating efficiency. In this embodiment, this is achieved mechanically firstly by the fact that a resting plate 256 is provided integral with the cylindrical wall 240 of the secure housing 252 and provides an abutment located at a fixed relative position with respect to the microwave outlet 220, onto which the bottom of the annular base 230 can rest at a predetermined axial position. In this manner, the rack 254 that supports the samples need not be rotated within the cavity 202 and the pressure (e.g. 425 psi) within the test tubes 232 can be withheld using the secure rack 254. Secondly, correct positioning can be achieved by the fact that the second end reflector 212 is provided with a diameter that is such that an outer edge (reference 270 in FIG. 4) of the second end reflector 212 contacts the cylindrical wall 240 when the second end reflector 212 is in position within the cylindrical cavity 202. As a result, the second end reflector 212 fits snugly within the cylindrical wall 240, thereby securing the removable rack 254 in place within the microwave cavity 202 for positioning the rack 254 at a desired location inside the cavity 202. Additional locating means, such as tab and groove (or pin and hole) engagement between the removable rack 254 and the secure housing 252, can also be provided if desired and could be used for circumferential alignment, for instance.

Still referring to FIG. 2, the second end reflector 212 and the annular base 230 of the first end reflector 210 are illustratively made integral to the removable rack 254. The removable rack 254 can be pulled out of the cylindrical microwave reflector 208 (as shown in FIG. 3) such that the test tubes 232 positioned in the removable rack 254 can be filled with microwave absorbent matter, for instance. The removable rack 254 can be removed from the cylindrical microwave reflector 208 using a handle 258. The second end reflector 212 and the annular base 230 of the first end reflector 210 can be made integral to the removable rack 254 using axial supports 260 that connect (e.g. secure) the second end reflector 212 and the annular base 230 to the removable rack 254. The axial supports 260 can be circumferentially disposed around the longitudinal axis 214 at the distance 248 from the axis 214.

Accordingly, FIG. 3 shows how the removable rack 254 can be pulled out of or inserted into the cylindrical microwave reflector (reference 208 in FIG. 2) by exerting a force on the handle 258 in accordance with the corresponding direction (i.e. upward or downward direction) of arrow 262. Furthermore, this view also shows a first set of screws 264 that can be used to fix the annular base 230 to the axial supports 260. Moreover, this view shows a second set of screws 266 that can be used to attach the cover 250 to the other end of the axial supports 260. Although shown, these fixation means are exemplary.

As shown in the figures, a central opening 228 of the first end reflector 210 can be protected using a dielectric protective cap 268. This dielectric protective cap 268 can be made of Teflon or any other dielectric material known to be transparent to waves of microwave wavelength. This dielectric protective cap 268 can protect the microwave outlet 220, which extends through the central opening 228 (and a central opening formed in the annular base 230 and aligned with the opening 228) and into the cylindrical microwave cavity 202 along the longitudinal axis 214 of the housing, as well as protect the annular conductive guide 236 of the magnetron outlet 220 from any corrosive gas or the like, which could be present in the secure housing 252. With such a dielectric protective cap 268, the waves of the magnetron 206 can still be propagated inside the microwave cavity 202 since the dielectric material of the cap 268 is invisible to the waves at the magnetron wavelength.

Figure 4:
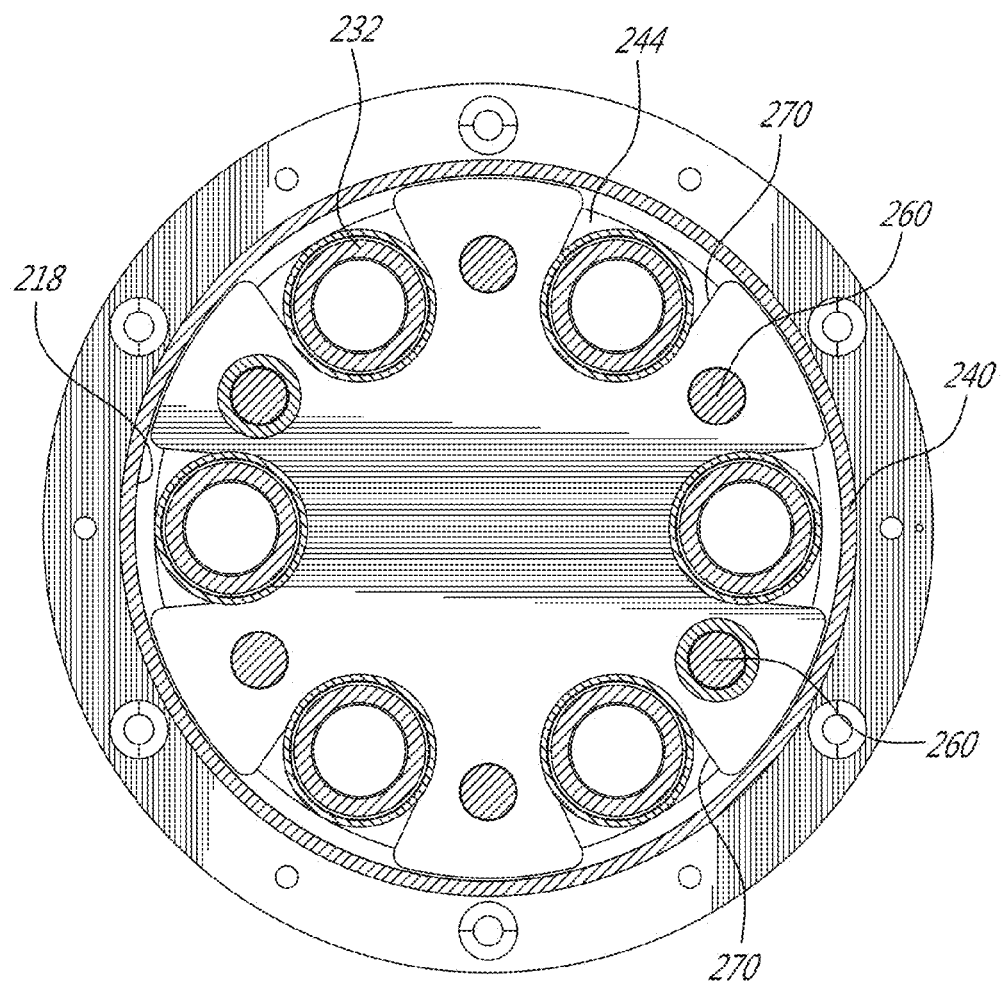
FIG. 4 show transversal cross-sectional view taken along cross-section lines 4-4 of FIG. 3.

FIG. 4 shows the openings 244 of the second end reflector 212 in greater detail. The openings 244 are disposed radially about a central axis (not shown) of the second end reflector 212 and equi-angularly spaced about the central axis at a fixed distance therefrom.

The openings 244 are shown to recess from an edge 270 of the second end reflector 212. In another embodiment, the second end reflector 212 can have openings 244 which are distanced from the edge 270 of the second end reflector 212. A test tube (reference 232 in FIG. 2) can be disposed within each of the openings 244 (illustratively six (6)) of the second end reflector 212 so as to extend along a direction substantially parallel to the central axis of the second end reflector 212 (and accordingly substantially parallel to the longitudinal axis 214). In this example, the test tubes 232, when disposed within the openings 244 of the second end reflector 212, are equi-angularly separated from one another, e.g. by an angle of sixty (60) degrees for six (6) test tubes 232, to provide equidistant spacing of the test tubes 232. Still, it is understood that other configurations can be used. It should be understood that, although six (6) test tubes 232 are illustrated as being received in the rack 254, the latter may comprise any suitable number of sample recipients.

The openings 244 can be designed to receive a corresponding test tube 232 in order to maintain it in position within the microwave cavity 202 when the test tube 232 is being heated in the microwave heater 200.

As will be understood by one skilled in the art and referring back to FIG. 2, the first end reflector 210 (particularly the annular base 320) and the resting plate 256, together with the microwave outlet 220 (particularly the annular conductive guide 236) illustratively form a magnetron launcher that couples the magnetron 206 with the microwave cavity 202. Magnetron launchers are generally used in conventional microwave heaters where they generally have microwave waveguides having a rectangular section to propagate the waves to the microwave cavity.

In the embodiment presented herein, the magnetron launcher is indeed a two-part piece formed from a portion of the removable rack 254 (e.g. the resting plate 256 and annular base 230, which are illustratively integrated together as discussed above) that sits in the microwave cavity 202 and holds the test tubes 232, and a portion of the magnetron 206 (e.g. the annular conductive guide 236). Together, the two pieces perform the required impedance matching arid ensure that the reflected power from the cavity 202 to the magnetron 206 is minimized. As less reflected power translates to less heat dissipated in the body of the magnetron 206, this in turn improves the heating performance and increasing the life of the magnetron 206. The reflection coefficient can also be adjusted by changing the dimensions (e.g. the axial distance 216 between the first and the second reflectors 210, 212, the thickness(es), and/or the diameters of the first and/or second reflectors 210, 212) of the rack 254, which in turn allows for different types (e.g. various sizes) and numbers of samples as in 232 to be received by the rack 254. For example, sample recipients having a diameter of about 1.25 inches and a height of 10 inches may be heated using the microwave heating devices described herein. Sample recipients having a height of 4 inches can also apply. Other dimensions may apply as well.

The magnetron launcher includes pieces having a concentric symmetry. This symmetry helps to establish transverse cylindrical modes of propagation within the cylindrical cavity 202. As illustrated in FIG. 2, when the axial distance 216 between the first and second end reflectors 210, 212 is larger than the microwave wavelength (4.81 inches in this case), the cylindrical cavity 202 could turn into a multi-mode cylindrical cavity, for instance. The drawback with such a multi-mode cylindrical cavity is that it could exhibit hot spots and cool spots. These hot and cool spots are undesired since the multi-mode cylindrical cavity cannot be used in order to uniformly heat the heating areas, for instance.

To limit unwanted modes, the second end reflector 212 can be used as a passive element and be placed at an axial distance 216 from the first end reflector that is smaller than the microwave wavelength (e.g. smaller than 4.81 inches). In one embodiment, the axial distance 216 is about 2 inches. It should be understood that other embodiments may apply. Providing the second end reflector 212 reduces the volume in which the microwave energy can travel. The microwaves are thus prevented from entering an upper region of the cavity 202 and are limited to a lower region (i.e. the cavity area 203) only. This in turn suppresses a multimode effect from the microwave cavity 202 and allows the standing waves (e.g. concentric and tangentially uniform standing waves symmetric about the axis 214) to be established only in the space (i.e. the cavity area 203) defined between the magnetron 206 and the second end reflector 212. The imposed TM01 mode can then be supported in the microwave cavity 202 and established as the predominant resonance mode (i.e. without any other transverse modes propagating within the cavity 202). Hot spots can therefore be removed.

In other words, the microwave cavity 202 is illustratively designed to support the transverse mode TM01. This mode oscillates symmetrically (e.g. with a circular or concentric geometry about the axis 214) inside the microwave cavity 202 when the distance between the first and second end reflectors 210, 212 is smaller than the microwave wavelength. By oscillating symmetrically with such a circular geometry, the TM01 mode forms an annular region of electromagnetic field which receives a uniform amount of electromagnetic energy. When disposed in an annular fashion, the heating areas can uniformly receive electromagnetic energy. Therefore, these heating areas can be heated uniformly without having to rely to mechanical rotating systems. As a result, it is possible to ensure the same exposure of samples as in 232 to the microwave radiation generated by the magnetron 206. Samples can also be heated rapidly and safely using the proposed configuration.

A known drawback of driving a microwave cavity as in 202 at a single mode is the impedance matching. Indeed, if the impedance of the magnetron as in 206 is not matched with the impedance of the microwave cavity as in 202, undesired retro reflections can be generated. These undesired reflections can limit the heating capacity of the cylindrical cavity as in 202 along with causing the magnetron as in 206 to overheat and/or break over time.

The magnetron launcher presented herein is designed to overcome such a drawback. Indeed, it is designed to sufficiently match the impedance of the magnetron 206 with the impedance of the cylindrical cavity 202. The embodiment presented in FIG. 2, for instance, has an adequately matched impedance and thus can provide an acceptable heating capacity and efficiency inside the microwave cavity, while reducing the reflections to be propagated back into the magnetron 206.

The impedance matching is relevant in the cylindrical cavity 202 since it can concentrate the electromagnetic energy inside the cylindrical cavity 202. In the process of optimizing the dimensions of the magnetron launcher, known techniques are used to evaluate an efficiency of the impedance matching. For instance, one can measure the retro reflections propagated back inside the magnetron 206 using a Vector Network Analyzer (VNA). However, implementing such a measurement setup can be complex. Moreover, the efficiency of impedance matching can be evaluated by measuring the heating capacity of the microwave heater 200. In other words, one can measure the maximum temperature achieved inside a test tube for different configurations of the magnetron launcher for a given period of time. By doing so, one can optimize the dimensions of the magnetron launcher by maximizing the temperature achieved. Additionally, one can measure the temperature of the magnetron 206 as a function of time for different configurations of the magnetron launcher. If, for instance, a first configuration of the magnetron launcher causes the temperature of the magnetron 206 to increase more rapidly than for a second configuration, this can be used as a tool for evaluating the efficiency of impedance matching. As one skilled in the art may appreciate, adapting the depth and width of the annular spacing 222 (extending radially around the microwave outlet 220) for impedance matching at a different wavelength can be done by testing or simulation.

In the embodiment referred to above with reference to FIGS. 3 and following, the magnetron 206 used is a Panasonic Magnetron model 2M261. This model can be air-cooled, emits microwave radiation having a frequency of 2.45 GHz (and conversely a wavelength of 4.81 inches), weights 0.8 kg, and has outline dimensions of 4.96 inches per 3.7 inches per 5.31 inches. It should be understood that other suitable magnetron models may apply.

According to the 2.45 GHz frequency and the load illustrated in FIG. 2, an annular spacing 222 having about 1 inch in depth and about 2.5 inches in diameter was found to provide satisfactory impedance matching in this embodiment.

Although dimensions specific to the illustrated embodiment are proposed herebelow, it will be readily understood that these dimensions can be optimized for obtaining an enhanced heating capacity, less reflections back in the magnetron 206, or more generally to adapt the microwave heater to a different application (e.g. heating bricks instead of test tubes). In the embodiment of FIG. 2, the microwave outlet 220 can have a diameter of about 1 inch and also can protrude by a distance of 1.25 inches from the resting plate of the first end reflector 210, and along the longitudinal axis 214. The diameter of the cylindrical reflector 208 (and accordingly of the microwave cavity 202) can be about 6 inches. The resting plate 256 can have a thickness of about 0.125 inch, and the annular base 230 can have a thickness of about 0.5 inch, an outside diameter slightly less than about 6.5 inches and an inside diameter of about 3 inches.

FIG. 5 shows an example of an electric field distribution inside the microwave cavity (reference 202 in FIG. 2) based on a finite element simulation performed with a finite element high frequency simulation software based on the geometry of the microwave heater (reference 200 in FIG. 2) disclosed in this specification. As shown in FIG. 5, all samples (e.g. the six (6) test tubes 232) are exposed to an equal electric field within the same concentric annular region 218 of the electromagnetic field. Therefore, the test tubes 232 can be heated uniformly. The dark spot 271 shows that the electric field distribution reaches a maximum in the center of the first and second end reflectors (references 210, 212 in FIG. 2), along the longitudinal axis (reference 214 in FIG. 2) of the cylindrical reflector 208. The pale spots 272 appear inside each of the test tubes 232 and represent the substance to be heated.

Figure 6A:
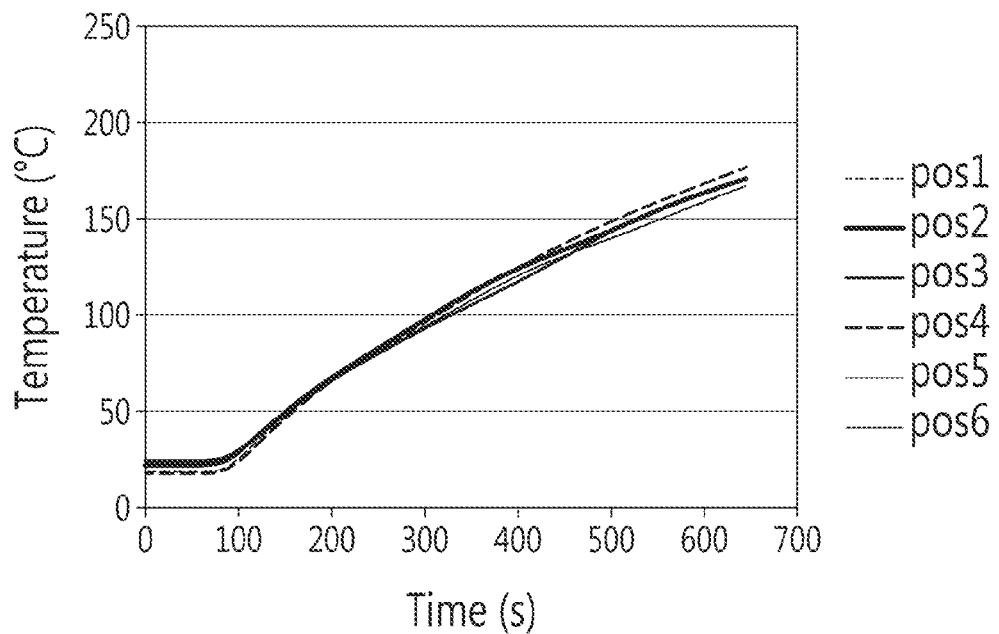
FIG. 6A is a graph plotting the temperature as a function for 6 circumferentially interspaced test tube positions.

FIG. 6A shows a graph of the temperature as a function of time for six (6) independent experiments for six (6) test tubes positioned sequentially at different positions (e.g. radial positions relative to the longitudinal axis of the microwave heater) in the microwave cavity in six (6) different runs. The temperature within each of the test tubes has been measured using optical fiber temperature sensors placed in certain tubes in all six (6) positions in the six (6) runs. The time to temperature curves recorded by the sensors for the six (6) positions were then plotted, as shown in FIG. 6A. As can be seen from FIG. 6A, the temperature increase seems relatively uniform for the six positions. This shows that there is no undesired contribution from adjacent tubes and that there is no temperature non-uniformity due to sample or tube difference. Thus, concentric annular regions of uniform electromagnetic field can be used in order to achieve uniform heating.

Figure 6B:
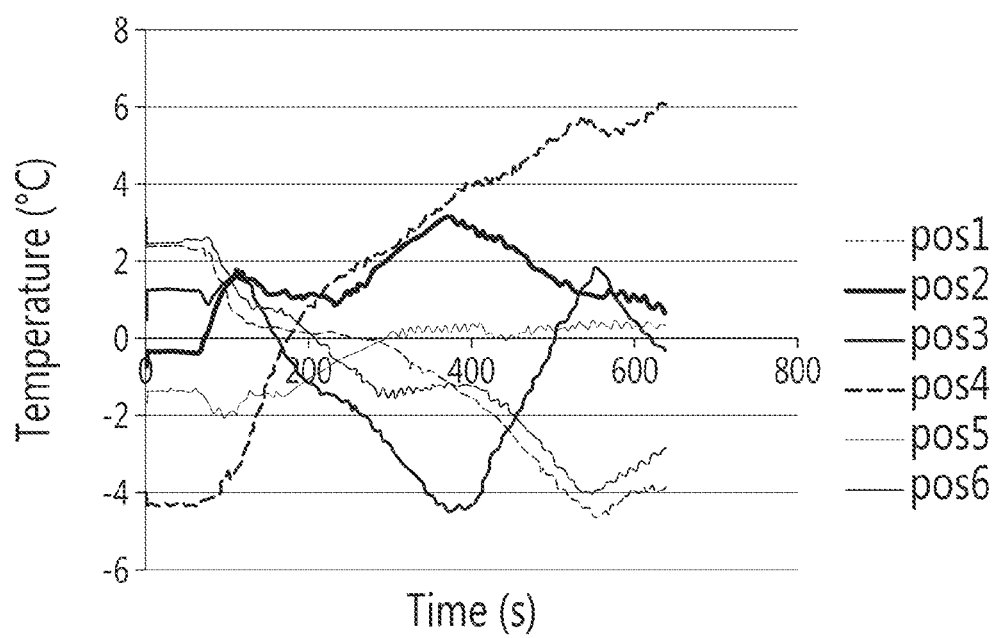
FIG. 6B is a graph plotting temperature deviation as a function of time for the 6 circumferentially interspaced test tube positions.

FIG. 6B shows the temperature deviation as a function of time (between each tube's temperature and an average temperature) for all six positions. It can be seen that, for most of the positions, uniformity in the range of ±4 degrees Celsius (or better) can be achieved throughout the heating process, starting from room temperature to about 180 degrees Celsius. It can also be seen in FIG. 6B that the maximum difference between the temperature of the tubes and the average temperature does not exceed 6 degrees Celsius.

Figure 7:
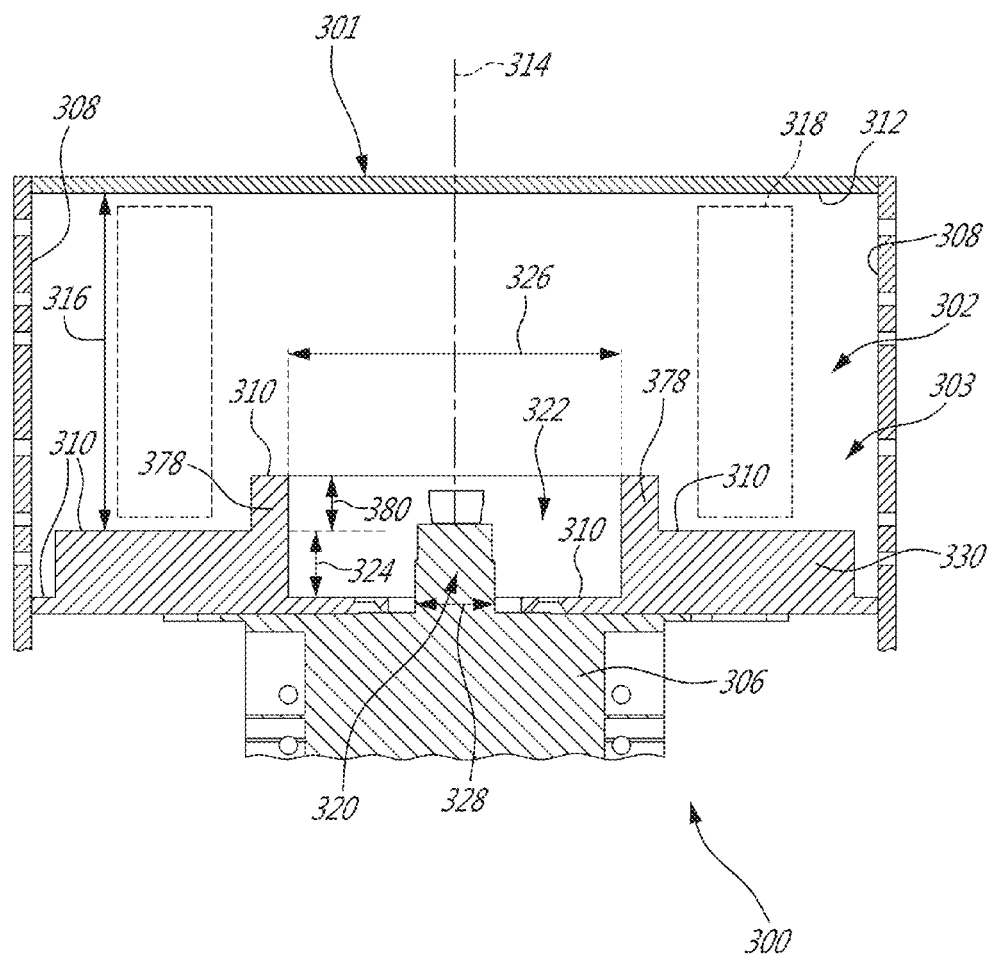
FIG. 7 is an axial cross-sectional view of a third example of a microwave heater.

FIG. 7 shows a third example of a microwave heater 300 in accordance with an alternative embodiment presented herein. This configuration was experimentally tested and has been shown to potentially provide better impedance matching than the configurations shown in the earlier figures. The main difference in this embodiment is the presence of an axially protruding ring 378.

More specifically, in this embodiment, the microwave heater 300 has a cylindrical reflector arrangement 301 extending along a longitudinal axis 314. The cylindrical reflector arrangement 301 includes an elongate cylindrical reflector 308, a first end reflector 310 and a second end reflector 312. The first and second end reflectors 310, 312 are provided at opposite ends of the cylindrical reflector 308 and are separated by an axial distance 316. The first and second end reflectors 310, 312 each extend along a plane substantially perpendicular to the longitudinal axis 314. The cylindrical reflector arrangement 301 defines therewithin a cylindrical cavity 302. A cylindrical cavity area 303 is further defined between the first end reflector 310 and the second end reflector 312 and it can be understood from FIG. 7 that the cylindrical cavity area 303 covers the entirety of the area of the cylindrical cavity 302.

In this embodiment, the first end reflector 310 rests on an annular base 330 and is concentric therewith. The annular base 330 has a central opening 328 which allows a microwave outlet 320 of a magnetron 306 to be positioned through the annular base 330 so as to extend into the cylindrical cavity area 303 along the longitudinal axis 314. The size and shape of the microwave outlet 320 and the central opening 328 are illustratively such that, when the microwave outlet 320 is inserted into the central opening 328, the microwave outlet 320 snugly fits within the central opening 328, thereby forming a seal. Moreover, the first end reflector 310 has a diameter smaller than that of the reflector 308 such that the first end reflector 310 fits inside the cylindrical reflector 308.

The first end reflector 310 is provided with an annular spacing 322 adjacent the central opening 328 of the annular base 220, the spacing 322 having a depth 324 and a width 326 and extending radially from the opening 328. In the illustrated embodiment, the annular spacing 322 is provided as a circular depression formed in the first end reflector 310. When the microwave outlet 320 is positioned within the central opening 328, the annular spacing 322 is then provided around the microwave outlet 320. Additionally, the annular base 330 comprises adjacent a center (not shown) thereof an axially protruding ring 378 that extends away from an upper surface (not shown) of the annular base 330 towards the second end reflector 312. With the microwave outlet 320 positioned within the central opening 328, the annular spacing 322 is defined between an inner surface (not shown) of the protruding ring 378 and an outer surface of the microwave outlet 320. The protruding ring 378 illustratively has a given thickness and a height 380 (as measured from an upper surface (not shown) of the annular base 330). It has been found that the annular spacing 322 concurrently with the axially protruding ring 378 can form a configuration which provides a sufficiently matched impedance between the magnetron 306 and the cylindrical cavity area 303. Henceforth, when an object is placed along an annular region of even heating 318, it can be heated uniformly with an enhanced heating efficiency.

Referring now to FIG. 8A, FIG. 8B, FIG. 9A, and FIG. 9B, an antenna may be attached to a tip of the magnetron (reference 206 in FIG. 2), e.g. to the outlet (reference 220 in FIG. 2), provided in the microwave heater (e.g. reference 200 in FIG. 2).

Figure 8B:
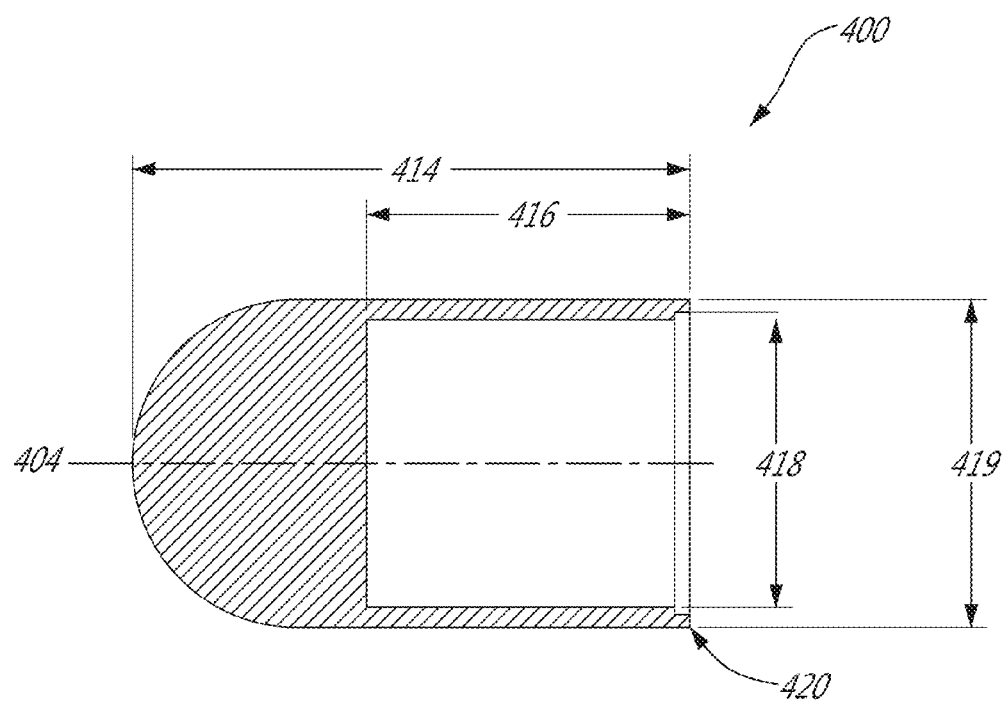
FIG. 8B is a cross-sectional view of the antenna of FIG. 8A.

FIG. 8A and FIG. 8B illustrate a first embodiment of an antenna extension 400. The antenna extension 400 is designed as a cap that can be attached to the tip of the magnetron 206. The antenna extension 400 illustratively comprises an open-ended and hollow cylindrical housing (or body) 402 having a longitudinal (or central) axis 404 and an inner surface 406. A convex-shaped cover (or cap) 408 is illustratively attached to a first end (or extremity) 410 of the housing 402, the first end 410 opposite the open end (or extremity) 412 of the housing 402. The antenna extension 400 can then be fitted (through the open end 412) over the magnetron tip, with the latter being received within the housing 402 and positioned in a spaced relationship relative to the inner surface 406. When so positioned, the magnetron tip is centered with and extends (i.e. is aligned) along the longitudinal axis 404 (which is in turn aligned with the longitudinal axis of the microwave heater's housing, not shown) towards the cover 408 and is centered within the housing 402.

The configuration of the antenna extension 400 is such that the magnetron tip can be suitably received therein. In one embodiment (see FIG. 8B), the antenna extension 400 has an overall length 414 of 1.050 inches, a housing length 416 of 0.610 inches, an inner housing diameter 418 of 0.545 inches, and an outer housing diameter 419 of 0.620 inches. An edge 420 provided at the end (reference 412 in FIG. 8A) of the housing (reference 402 in FIG. 8A) may further have a stepped profile (not shown). It should be understood that, depending on the configuration of the microwave heater, other dimensions may apply.

The antenna extension 400 prevents arcing near the magnetron tip, which arcing may be caused by the microwave energy generated by the magnetron 206. In addition, the configuration of the antenna extension 400 is such that the latter does not modify the propagation mode (e.g. TM01) of the microwaves generated by the magnetron 206.

Figure 9B:
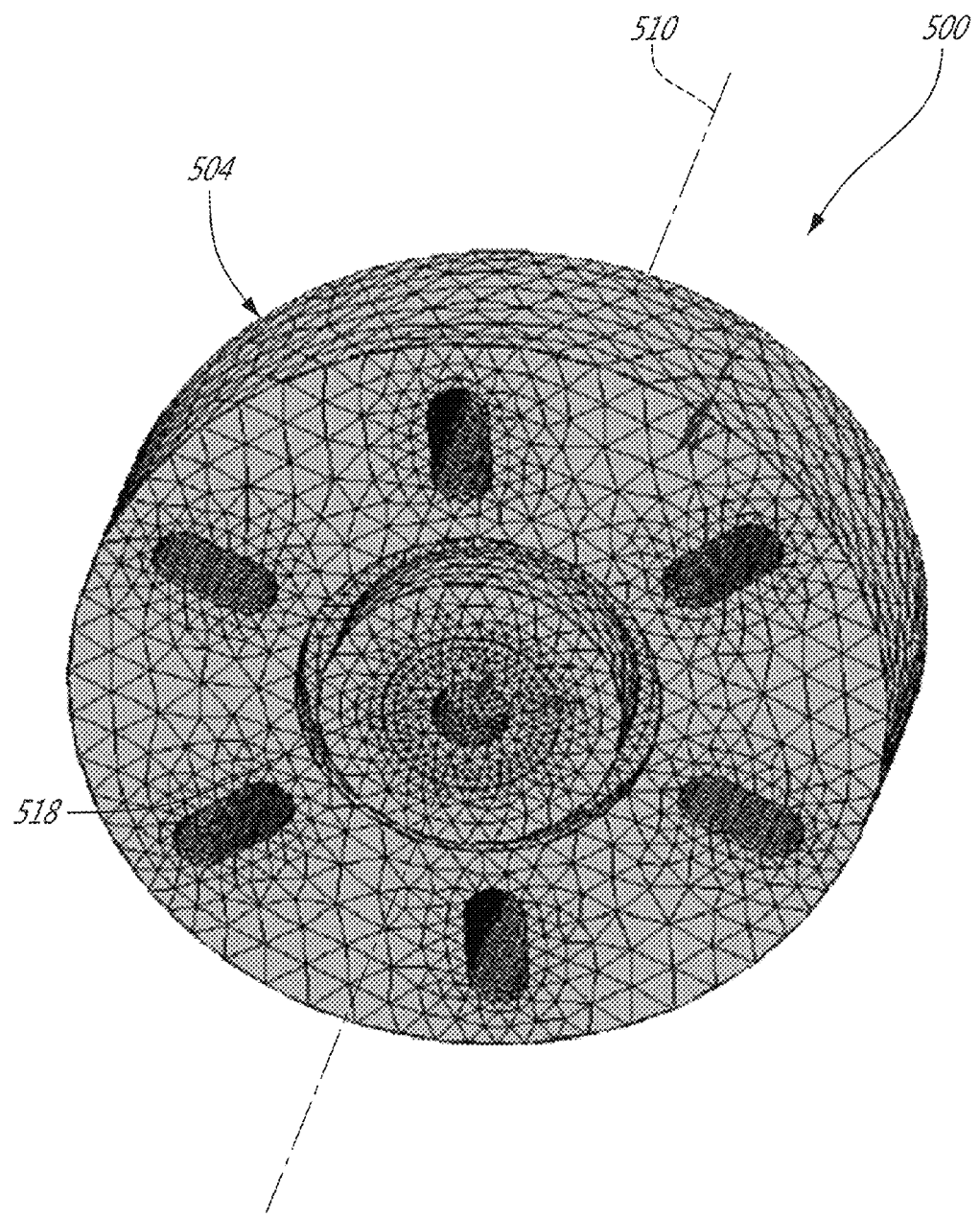
FIG. 9B is a perspective view of the monopole antenna of FIG. 9A.

Referring now to FIG. 9A and FIG. 9B, there is illustrated an antenna extension or structure 500 that can be attached to the magnetron tip 502, in accordance with a second embodiment. The antenna structure 500 comprises a transition structure 502 and a monopole antenna 504 that radiates with an omnidirectional radiation pattern and extends away from the transition structure 502 (into the internal cavity, and particularly the cylindrical cavity area, reference 203 in FIG. 2, of the microwave heater) for heating samples as in 506 positioned within the microwave heater's housing 508. When the antenna structure 500 is in position over the magnetron tip (not shown), the latter is centered with and extends along a central axis 510 of the antenna structure 500, the central axis 510 in turn aligned with the longitudinal axis of the microwave heater's housing, not shown.

The transition 502 illustratively comprises a first cylindrical body 512 connected to a tapered body 514 and a second cylindrical body 516. In one embodiment, the bodies 512, 512, and 516 are hollow and adapted to receive the magnetron tip therein. The monopole antenna 504 is then secured to the second cylindrical body 516. For this purpose, an opening 518 may be formed in the monopole antenna 504 and adapted to receive the second cylindrical body 516 therein for connecting the monopole antenna 504 to the transition 502. The monopole antenna 504 may be made of Teflon or any other suitable material. In one embodiment, the antenna structure 500 may be received within a protective housing (not shown).

The dimensions of the antenna structure 500 are selected to achieve suitable coupling. In one embodiment, the first body 512 has a diameter of 0.60 inches and a length of about 0.70 inches, the tapered body 514 a length of about 0.40 inches and a diameter of about 0.25 inches at a tapered end thereof (not shown), and the second body 516 has a diameter of about 0.20 inches and a length of about 0.75 inches to 1 inch. The monopole antenna 504 illustratively has a diameter of about 0.60 inches and a length of about 0.40 inches. It should be understood that other dimensions suitable for achieving the desired coupling may apply.

Figure 10A:
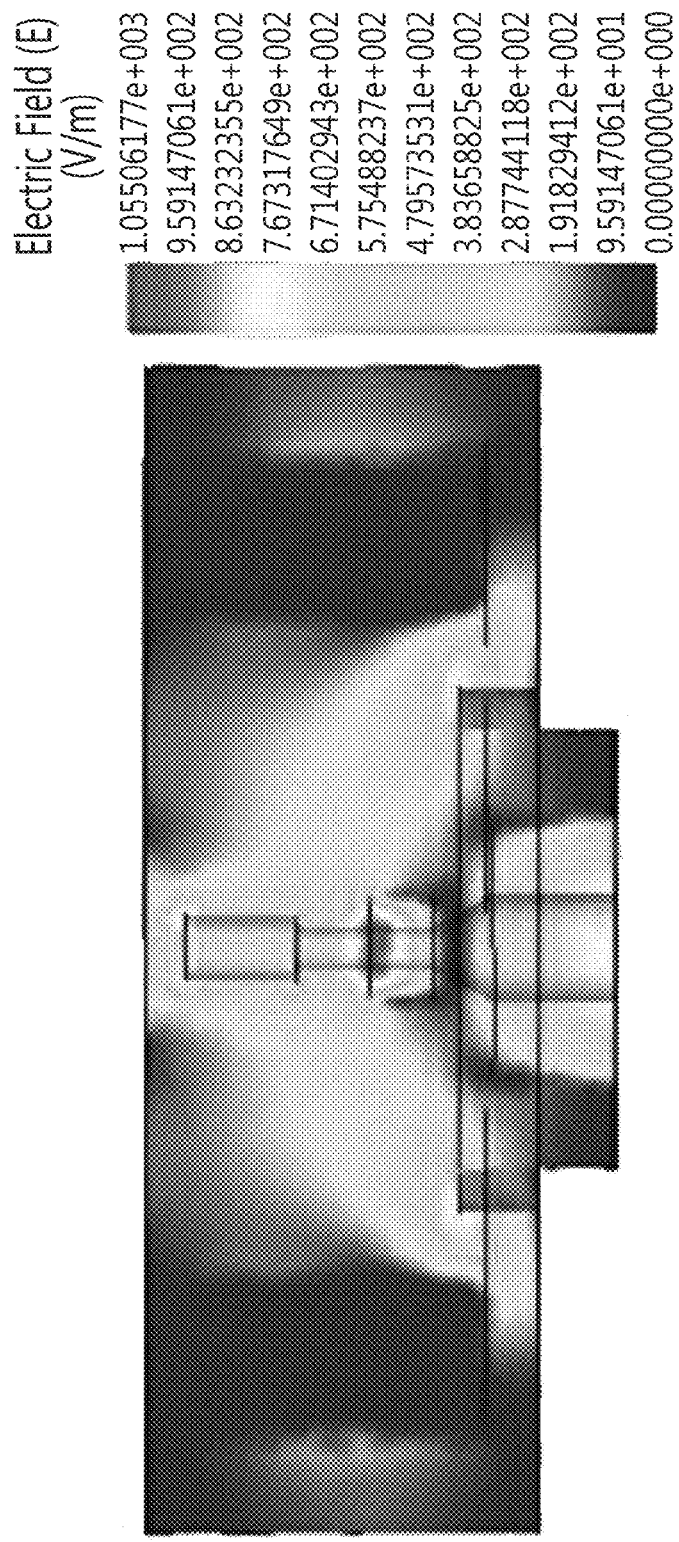
FIG. 10A, FIG. 10B, and FIG. 10C illustrate an electric field distribution with the antenna arrangement of FIG. 9A secured to a microwave heater, in accordance with one embodiment.
Figure 10B:
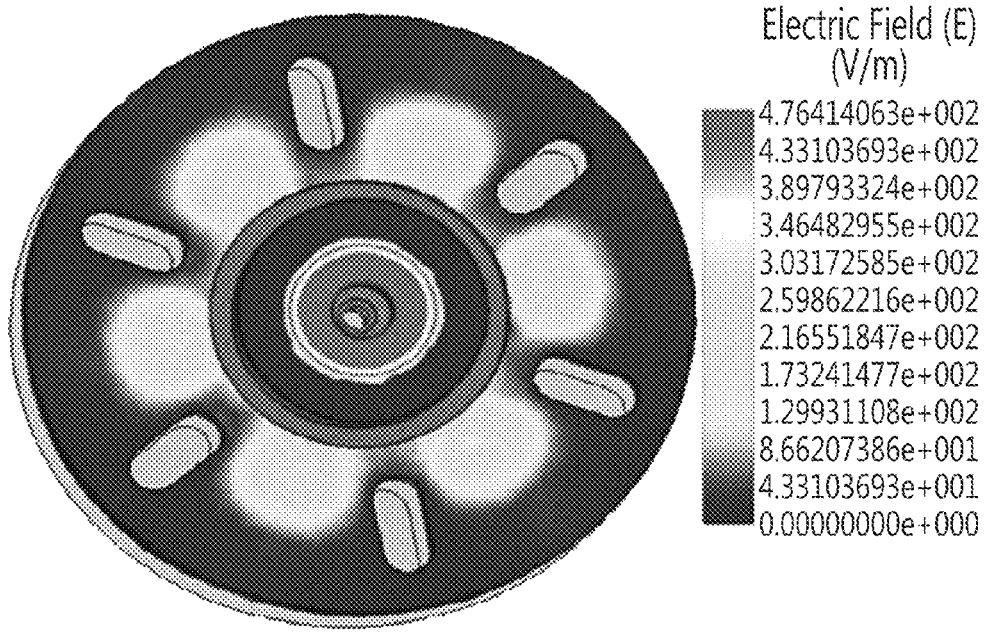
Figure 10C:
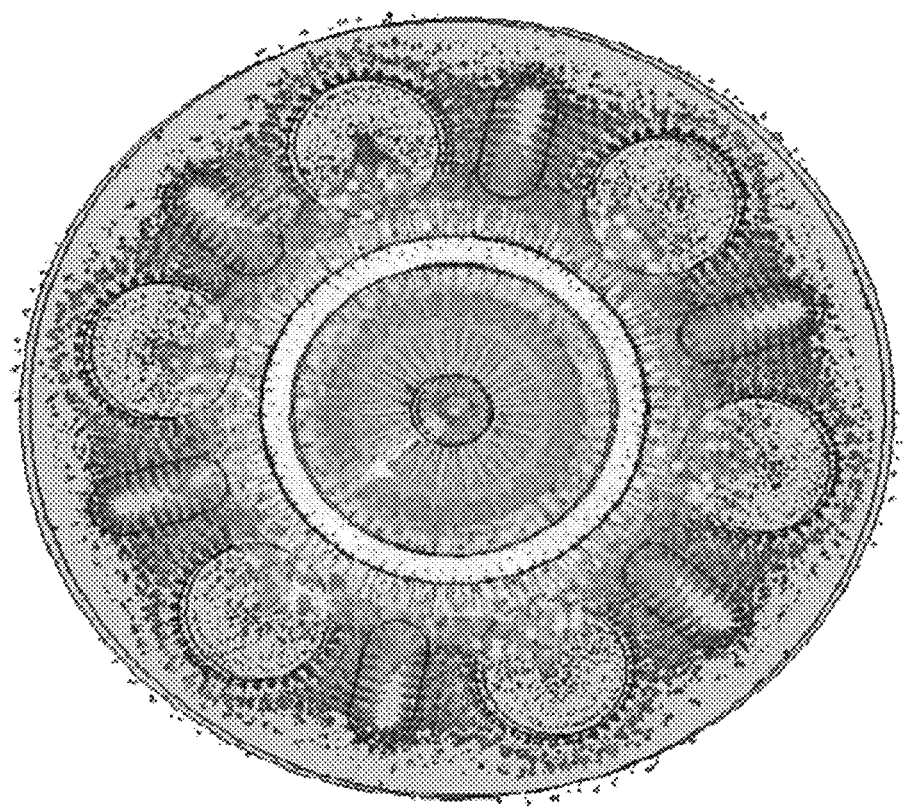

The antenna structure 500 is illustratively provided at an interface between the magnetron (reference 206 in FIG. 2) and the microwave heater's internal cavity (reference 202 in FIG. 2) and converts (using the transition 502 that serves as a transmission line in TEM mode) the microwave mode generated by the magnetron 206 to a TEM mode for uniformly heating samples received in the cylindrical cavity 202. This in turn can compensate for any imperfections (e.g. resulting from manufacturing) in the radiating element (not shown) of the magnetron 206 that would affect uniformity of the radiation pattern. Using the antenna 500 can therefore ensure that the microwave distribution inside the microwave cavity (reference 202 in FIG. 2) remains axially symmetrical and uniform, with a "donut" shape radiation pattern being achieved. Accordingly, heat uniformity can be obtained. This can be seen in FIG. 10A, FIG. 10B, FIG. 10C (electric field distribution), which illustrate results obtained by simulating the antenna structure 500 considering air as the filling material. In addition, the heating efficiency of the microwave heater (reference 200 in FIG. 2) can be improved using the antenna structure 500.

As can be seen therefore, the examples described above and illustrated are intended to be exemplary only. The scope is indicated by the appended claims.

What is claimed is:

1. A microwave heater comprising:
   a cylindrical housing having an inner surface defining an internal cavity, the cylindrical housing having a top end and a bottom end;
   a microwave generator secured to the housing adjacent to the bottom end; and
   a sample recipient holder received inside the internal cavity, the sample recipient holder comprising:
   an annular base member positioned adjacent the bottom end, the base member having a central axis coinciding with a longitudinal axis of the housing and a first opening formed along the central axis, a portion of the microwave generator extending through the first opening along the central axis for emitting into the internal cavity electromagnetic waves centered at a given microwave wavelength, and
   a circular support plate substantially parallel to the base member and concentric therewith, the support plate separated from the base member by an axial distance towards the top end of the cylindrical housing and defining a cavity portion within the internal cavity between the annular base member and the circular support plate, in which the portion of the microwave generator guides the electromagnetic waves, the axial distance being less than the given microwave wavelength for establishing a Transverse Magnetic (TM) 01 mode as a predominant resonance mode inside the cavity portion, thereby suppressing a multimode effect from the cavity portion.

2. The microwave heater of claim 1, wherein the housing further comprises at the bottom end thereof a circular resting plate having a central axis coinciding with the longitudinal axis, a second opening formed along the central axis of the resting plate, the base member abutting against the resting plate with the first opening aligned with the second opening and the portion of the microwave generator extending through the aligned first and second openings, the resting plate forming with the base member a magnetron launcher coupling the microwave generator to the internal cavity.

3. The microwave heater of claim 2, wherein the housing, the support plate, and the base member are made of an electrically conductive material adapted to reflect the electromagnetic waves, thereby preventing the electromagnetic waves from propagating outside of the cavity portion.

4. The microwave heater of claim 3, wherein the support plate has formed therein a plurality of apertures each adapted to receive a corresponding one of a plurality of sample recipients therein, each one of the plurality of sample recipients extending along a direction substantially parallel to the longitudinal axis and protruding into the cavity portion.

5. The microwave heater of claim 4, wherein the plurality of apertures are disposed radially about a central axis of the support plate and equi-angularly spaced about the central axis of the support plate at a fixed distance therefrom for uniformly exposing the plurality of sample recipients to the electromagnetic waves, the central axis of the support plate coinciding with the longitudinal axis of the housing.

6. The microwave heater of claim 1, wherein the sample recipient holder is releasably secured to the housing with an outer edge of the support plate contacting the inner surface of the housing for securing the sample recipient holder in place within the internal cavity.

7. The microwave heater of claim 1, wherein the base member has a depression formed therein, the depression extending radially from the first opening and defining around the portion of the microwave generator an annular spacing providing impedance matching.

8. The microwave heater of claim 1, further comprising a protective member disposed over the portion of the microwave generator, the protective member made of a dielectric material transparent to the electromagnetic waves.

9. The microwave heater of claim 1, further comprising an antenna extension comprising a hollow cylindrical body having a first extremity and a second extremity opposite the first extremity and a convex cap secured to the first extremity, the portion of the microwave generator adapted to be received in the body through the second extremity and centered within the body.

10. The microwave heater of claim 1, further comprising an antenna extension comprising a transition structure, the transition structure having a first and a second cylindrical body interconnected by a tapered body, and a monopole antenna connected to the second body, the portion of the microwave generator adapted to be centered within the transition structure.

11. A cylindrical reflector arrangement for a microwave heater, the cylindrical reflector arrangement comprising:
   a cylindrical housing having an inner surface defining an internal cavity, the cylindrical housing having a top end and a bottom end; and
   a sample recipient holder received inside the internal cavity, the sample recipient holder comprising:
      an annular base member positioned adjacent a bottom end of the housing, the base member having a central axis coinciding with a longitudinal axis of the housing and a first opening formed along the central axis, the first opening adapted to receive a portion of a microwave generator adapted to generate into the internal cavity electromagnetic waves centered at a given microwave wavelength, and
      a circular support plate substantially parallel to the base member and concentric therewith, the support plate separated from the base member by an axial distance towards the top end of the cylindrical housing and defining a cavity portion within the internal cavity between the annular base member and the circular support plate, in which the portion of the microwave generator guides the electromagnetic waves, the axial distance being less than the given microwave wavelength for establishing a Transverse Magnetic (TM) 01 mode as a predominant resonance mode inside the cavity portion, thereby suppressing a multimode effect from the cavity portion.

12. The reflector arrangement of claim 11, wherein the housing, the support plate, and the base member are made of an electrically conductive material adapted to reflect the electromagnetic waves, thereby preventing the electromagnetic waves from propagating outside of the cavity portion.

13. The reflector arrangement of claim 11, wherein the housing further comprises at the first end thereof a circular resting plate having a central axis coinciding with the longitudinal axis, a second opening formed along the central axis of the resting plate, the base member abutting against the resting plate with the first opening aligned with the second opening, the aligned first and second openings adapted to receive therein the portion of the microwave generator, the resting plate forming with the base member a magnetron launcher coupling the microwave generator to the internal cavity.

14. The reflector arrangement of claim 11, wherein the support plate has formed therein a plurality of apertures each adapted to receive a corresponding one of a plurality of sample recipients therein, each one of the plurality of sample recipients extending along a direction substantially parallel to the longitudinal axis and protruding into the cavity portion.

15. The reflector arrangement of claim 14, wherein the plurality of apertures are disposed radially about a central axis of the support plate and equi-angularly spaced about the central axis of the support plate at a fixed distance therefrom for uniformly exposing the plurality of sample recipients to the electromagnetic waves, the central axis of the support plate coinciding with the longitudinal axis of the housing.

16. The reflector arrangement of claim 11, wherein the sample recipient holder is releasably secured to the housing with an outer edge of the support plate contacting the inner surface of the housing for securing the sample holder in place within the internal cavity.

17. The reflector arrangement of claim 11, wherein the base member has a depression formed therein, the depression extending radially from the first opening and defining around the portion of the microwave generator an annular spacing providing impedance matching.

18. A method of microwave heating of samples, the method comprising:
   providing a cylindrical housing having an inner surface defining an internal cavity, the cylindrical housing having a top end and a bottom end;
   receiving a sample recipient holder inside the internal cavity, the sample recipient holder comprising an annular base member and a circular support plate defining a cavity portion therebetween and having a central axis coinciding with a longitudinal axis of the housing, the support plate separated from the base member by an axial distance that is less than a given microwave wavelength for establishing a Transverse Magnetic (TM) 01 mode as a predominant resonance mode inside the cavity portion between the annular base member and the circular support plate, thereby suppressing a multimode effect from the cavity portion, the support plate having formed therein a plurality of apertures each adapted to receive therein corresponding ones of a plurality of sample recipients, the plurality of apertures disposed radially and equi-angularly about the central axis at a fixed distance therefrom, each one of the plurality of sample recipients extending along a direction substantially parallel to the longitudinal axis and protruding into the cavity portion; and
   applying electromagnetic waves generated by a microwave generator to the cavity portion, the microwave generator secured to the housing and having a portion extending along the central axis into the cavity portion for emitting therein electromagnetic waves centered at the given wavelength.

* * * * *